United States Patent
Yan et al.

(10) Patent No.: US 12,126,170 B2
(45) Date of Patent: Oct. 22, 2024

(54) BLOCKCHAIN-BASED ELECTRICITY CHARGE SETTLEMENT METHOD AND SYSTEM FOR ENERGY STORAGE STATION

(71) Applicants: STATE GRID BLOCKCHAIN TECHNOLOGY (BEIJING) CO., LTD., Beijing (CN); State Grid Digital Technology Holding CO., LTD., Beijing (CN);
(Continued)

(72) Inventors: Huafeng Yan, Beijing (CN); Dong Wang, Beijing (CN); Jiaxing Xuan, Beijing (CN); Da Li, Beijing (CN); Shuai Chen, Beijing (CN); Shaoqin Han, Beijing (CN); Yuxiang Cai, Beijing (CN); Yanxu Dong, Beijing (CN); Zhen Xue, Beijing (CN); Zheng Jia, Beijing (CN); Xinyan Wang, Beijing (CN)

(73) Assignees: STATE GRID BLOCKCHAIN TECHNOLOGY (BEIJING) CO., LTD., Beijing (CN); State Grid Digital Technology Holding CO., LTD., Beijing (CN);
(Continued)

( * ) Notice: Subject to any disclaimer, the term of this patent is extended or adjusted under 35 U.S.C. 154(b) by 367 days.

(21) Appl. No.: 17/641,814

(22) PCT Filed: Aug. 30, 2021

(86) PCT No.: PCT/CN2021/115317
§ 371 (c)(1),
(2) Date: Mar. 9, 2022

(87) PCT Pub. No.: WO2022/105349
PCT Pub. Date: May 27, 2022

(65) Prior Publication Data
US 2023/0155381 A1    May 18, 2023

(30) Foreign Application Priority Data
Nov. 19, 2020   (CN) .......................... 202011307596.1

(51) Int. Cl.
*H02J 3/00*        (2006.01)
*G06N 3/084*       (2023.01)
*H04L 9/00*        (2022.01)

(52) U.S. Cl.
CPC .............. *H02J 3/008* (2013.01); *G06N 3/084* (2013.01); *H04L 9/50* (2022.05); *H04L 2209/463* (2013.01)

(58) Field of Classification Search
CPC . H02J 3/008; G06N 3/084; H04L 9/50; H04L 2209/463; G06Q 30/04;
(Continued)

(56) References Cited

U.S. PATENT DOCUMENTS 10,762,564 B2 *   9/2020   Dechu ..................... G06Q 40/04
11,626,990 B1 *   4/2023   Weber ................... H04L 9/3247
                                                              713/178
(Continued)

FOREIGN PATENT DOCUMENTS

CN    107423978 A    12/2017
CN    107817381 A    3/2018

OTHER PUBLICATIONS

Zhao, W.; Lv, J.; Yao, X.; Zhao, J.; Jin, Z.; Qiang, Y.; Che, Z.; Wei, C. Consortium Blockchain-Based Microgrid Market Transaction Research. Energies 2019, 12, 3812. https://doi.org/10.3390/en12203812 (Year: 2019).*
(Continued)

*Primary Examiner* — Christopher E. Everett (57) ABSTRACT

Disclosed is a blockchain-based electricity charge settlement method and system for an energy storage station. A trusted terminal directly collects two-way electricity quantity data
(Continued)

of an energy storage station, and distributes the two-way electricity quantity data to a blockchain; and a consensus node of a power-consuming enterprise and a consensus node of an energy storage station investment operator in the blockchain perform consensus calculation on the two-way electricity quantity data, and write the two-way electricity quantity data into the blockchain after reaching a consensus. The two-way electricity quantity data is accurate and cannot be tampered with, ensuring authenticity of the two-way electricity quantity data. A smart settlement contract is executed, an electricity charge settlement result is generated automatically to ensure authenticity of the electricity charge settlement result, and the electricity charge settlement result is written into the blockchain to prevent the electricity charge settlement result from being tampered with.

2 Claims, 6 Drawing Sheets (71) Applicants: STATE GRID HENAN INFORMATION & TELECOMMUNICATION COMPANY, Henan (CN);
INFORMATION AND COMMUNICATION BRANCH OF STATE GRID FUJIAN ELECTRIC POWER CO., LTD., Fujian (CN)
STATE GRID XIONG'AN FINANCIAL TECHNOLOGY GROUP CO., LTD., Hebei (CN);

(73) Assignees: STATE GRID HENAN INFORMATION & TELECOMMUNICATION COMPANY, Zhengzhou (CN);
INFORMATION AND COMMUNICATION BRANCH OF STATE GRID FUJIAN ELECTRIC POWER CO., LTD., Fuzhou
(CN)STATE GRID XIONG'AN FINANCIAL TECHNOLOGY GROUP CO., LTD., Baoding (CN);

(58) Field of Classification Search
CPC .... G06Q 30/06; G06Q 2220/00; G06Q 50/06; G06Q 40/04; G06F 21/64; G06F 16/27; G06F 21/602
See application file for complete search history.

(56) References Cited

U.S. PATENT DOCUMENTS

| | | | |
|---|---|---|---|
| 2017/0103468 A1* | 4/2017 | Orsini | G06Q 50/06 |
| 2017/0358041 A1* | 12/2017 | Forbes, Jr. | G05D 3/12 |
| 2019/0165931 A1* | 5/2019 | Bharti | G06Q 20/02 |

OTHER PUBLICATIONS

Merlinda Andoni, Valentin Robu, David Flynn, Simone Abram, Dale Geach, David Jenkins, Peter McCallum, Andrew Peacock, Blockchain technology in the energy sector: A systematic review of challenges and opportunities, Renewable and Sustainable Energy Reviews, vol. 100, 2019, pp. 143-174 (Year: 2019).*
Johanning, Simon, and Thomas Bruckner. "Blockchain-based peer-to-peer energy trade: a critical review of disruptive potential." 2019 16th International Conference on the European Energy Market (EEM). IEEE, 2019 (Year: 2019).*
Pop, C.; Cioara, T.; Antal, M.; Anghel, I.; Salomie, I.; Bertoncini, M. Blockchain Based Decentralized Management of Demand Response Programs in Smart Energy Grids. Sensors 2018, 18, 162. https://doi.org/10.3390/s18010162 (Year: 2018).*
Kumar, N.M.; Chand, A.A.; Malvoni, M.; Prasad, K.A.; Mamun, K.A.; Islam, F.R.; Chopra, S.S. Distributed Energy Resources and the Application of AI, IoT, and Blockchain in Smart Grids. Energies 2020, 13, 5739. https://doi.org/10.3390/en13215739 (Year: 2020).*
Wang, N.; Zhou, X.; Lu, X.; Guan, Z.; Wu, L.; Du, X.; Guizani, M. When Energy Trading Meets Blockchain in Electrical Power System: The State of the Art. Appl. Sci. 2019, 9, 1561. https://doi.org/10.3390/app9081561 (Year: 2019).*

* cited by examiner

BLOCKCHAIN-BASED ELECTRICITY CHARGE SETTLEMENT METHOD AND SYSTEM FOR ENERGY STORAGE STATION

TECHNICAL FIELD

The present disclosure relates to the technical field of electric power, and in particular, to a blockchain-based electricity charge settlement method and system for an energy storage station.

BACKGROUND

An energy storage station is charged in the case of a valley electricity price and discharged in the case of a peak electricity price, to obtain a certain income from the differential electricity prices. This can effectively reduce an electricity charge of an enterprise. For a power-consuming enterprise, there is a certain financial pressure to use its own funds to build an energy storage station. Therefore, at present, the energy storage station on a load side is built in an energy performance contracting mode, in other words, the energy storage station is built through cooperation between an energy storage station investment operator and an enterprise. Specifically, distribution devices and two-way meters connected to the energy storage station are deployed in the enterprise, the energy storage station investment operator obtains electricity quantity data of the energy storage station from the enterprise and generates an electricity charge settlement document, and the energy storage station investment operator and the enterprise share earnings based on the electricity charge settlement document.

However, in the above mode, it is difficult to ensure authenticity of the electricity quantity data obtained by the energy storage station investment operator or authenticity of electricity charge settlement conducted by the energy storage station investment operator.

SUMMARY

To resolve the above technical problems, embodiments of the present disclosure provide a blockchain-based electricity charge settlement method and system for an energy storage station, to ensure authenticity of data. The technical solutions are as follows:

A blockchain-based electricity charge settlement method for an energy storage station includes:

collecting, by a trusted terminal, two-way electricity quantity data of an energy storage station, and distributing the two-way electricity quantity data to a blockchain, where the collecting, by a trusted terminal, two-way electricity quantity data of an energy storage station, and distributing the two-way electricity quantity data to a blockchain includes: collecting, by the trusted terminal, the two-way electricity quantity data of the energy storage station, and determining whether the two-way electricity quantity data meets a precision requirement; and if the two-way electricity quantity data meets the precision requirement, distributing the two-way electricity quantity data to the blockchain; or if the two-way electricity quantity data does not meet the precision requirement, compensating the two-way electricity quantity data, replacing the two-way electricity quantity data with compensated two-way electricity quantity data, and returning to perform the step of determining whether the two-way electricity quantity data meets the precision requirement, where the determining whether the two-way electricity quantity data meets a precision requirement includes: obtaining a sampling error value of the trusted terminal, a sampling error value of a current transformer in the energy storage station, and a sampling error value of a voltage transformer in the energy storage station, inputting the sampling error value of the trusted terminal, the sampling error value of the current transformer, and the sampling error value of the voltage transformer into a pre-trained back propagation (BP) neural network model, to obtain a predicted electricity quantity output by the pre-trained BP neural network model, and determining whether an error between the predicted electricity quantity and the two-way electricity quantity data collected by the trusted terminal exceeds a specified threshold; a process of training a BP neural network model includes: initializing parameters of each layer in the BP neural network model; selecting a training sample from a sample set; inputting the training sample into the BP neural network model to obtain a predicted electricity quantity output by the BP neural network model, where the training sample is the sampling error value of the trusted terminal, the sampling error value of the current transformer in the energy storage station, and the sampling error value of the voltage transformer in the energy storage station; inputting the predicted electricity quantity and the two-way electricity quantity data of the energy storage station into a neural network error function $$E = \frac{1}{2}\sum_{q=1}^{p}\sum_{K=1}^{L}(T_k - O_k)^2$$

to obtain an error, where $O_k$ represents the predicted electricity quantity, $T_k$ represents the two-way electricity quantity data of the energy storage station, p represents a quantity of training samples, L represents a quantity of nodes at an output layer in the BP neural network model, K represents a node at the output layer in the BP neural network model, and E represents the error; determining whether an error between the predicted electricity quantity and a reference electricity quantity is within a specified range; and if the error between the predicted electricity quantity and the reference electricity quantity is within the specified range, ending the training; or if the error between the predicted electricity quantity and the reference electricity quantity is not within the specified range, transmitting the error to each layer in the BP neural network model based on an order from the output layer to an input layer in the BP neural network model, to update the parameters of each layer in the BP neural network model, and returning to the step of selecting the training sample from the sample set; and the compensating the two-way electricity quantity data includes: compensating the two-way electricity quantity data by using a compensation formula $$C_k = O_k + \left(-\eta \frac{\partial E}{\partial W_{ki}}(T_k - O_k)\right),$$

where $O_k$ presents the predicted electricity quantity, $T_k$ represents the two-way electricity quantity data of the energy storage station, $W_{ki}$ represents a weight of an $i^{th}$ node from a hidden layer to the output layer, $\eta$ represents a network learning rate, and $C_k$ represents the compensated two-way electricity quantity data;

performing, by a consensus node of a power-consuming enterprise and a consensus node of an energy storage station investment operator in the blockchain, consensus calculation on the two-way electricity quantity data, and after reaching a consensus, selecting one of the consensus node of the power-consuming enterprise and the consensus node of the energy storage station investment operator as a first accounting node;

processing, by the first accounting node, the two-way electricity quantity data to obtain a first target block, and writing the first target block into the blockchain;

executing a smart settlement contract, obtaining basic settlement data from the blockchain, performing electricity charge settlement based on the basic settlement data to obtain an electricity charge settlement result, and distributing the electricity charge settlement result to the blockchain, where the basic settlement data at least includes: two-way electricity quantity data in the first target block;

selecting, by the consensus node of the power-consuming enterprise and the consensus node of the energy storage station investment operator in the blockchain after reaching a consensus on the electricity charge settlement result, one of the consensus node of the power-consuming enterprise and the consensus node of the energy storage station investment operator as a second accounting node; and processing, by the second accounting node, the electricity charge settlement result to obtain a second target block, and writing the second target block into the blockchain.

The distributing the two-way electricity quantity data to a blockchain includes:

encrypting the two-way electricity quantity data, and distributing encrypted two-way electricity quantity data to the blockchain.

A blockchain-based electricity charge settlement system for an energy storage station includes:

a trusted terminal, configured to collect two-way electricity quantity data of an energy storage station, and distribute the two-way electricity quantity data to a blockchain, where the trusted terminal is specifically configured to: collect the two-way electricity quantity data of the energy storage station, and determine whether the two-way electricity quantity data meets a precision requirement; and if the two-way electricity quantity data meets the precision requirement, distribute the two-way electricity quantity data to the blockchain; or if the two-way electricity quantity data does not meet the precision requirement, compensate the two-way electricity quantity data, replace the two-way electricity quantity data with compensated two-way electricity quantity data, and return to perform the step of determining whether the two-way electricity quantity data meets the precision requirement, where the determining whether the two-way electricity quantity data meets a precision requirement includes: obtaining a sampling error value of the trusted terminal, a sampling error value of a current transformer in the energy storage station, and a sampling error value of a voltage transformer in the energy storage station, inputting the sampling error value of the trusted terminal, the sampling error value of the current transformer, and the sampling error value of the voltage transformer into a pre-trained BP neural network model, to obtain a predicted electricity quantity output by the pre-trained BP neural network model, and determining whether an error between the predicted electricity quantity and the two-way electricity quantity data collected by the trusted terminal exceeds a specified threshold; a process of training a BP neural network model includes: initializing parameters of each layer in the BP neural network model; selecting a training sample from a sample set; inputting the training sample into the BP neural network model to obtain a predicted electricity quantity output by the BP neural network model, where the training sample is the sampling error value of the trusted terminal, the sampling error value of the current transformer in the energy storage station, and the sampling error value of the voltage transformer in the energy storage station; inputting the predicted electricity quantity and the two-way electricity quantity data of the energy storage station into a neural network error function $$E = \frac{1}{2}\sum_{q=1}^{P}\sum_{K=1}^{L}(T_k - O_k)^2$$

to obtain an error, where $O_k$ represents the predicted electricity quantity, $T_k$ represents the two-way electricity quantity data of the energy storage station, p represents a quantity of training samples, L represents a quantity of nodes at an output layer in the BP neural network model, K represents a node at the output layer in the BP neural network model, and E represents the error; determining whether an error between the predicted electricity quantity and a reference electricity quantity is within a specified range; and if the error between the predicted electricity quantity and the reference electricity quantity is within the specified range, ending the training; or if the error between the predicted electricity quantity and the reference electricity quantity is not within the specified range, transmitting the error to each layer in the BP neural network model based on an order from the output layer to an input layer in the BP neural network model, to update the parameters of each layer in the BP neural network model, and returning to the step of selecting the training sample from the sample set; and the compensating the two-way electricity quantity data includes: compensating the two-way electricity quantity data by using a compensation formula $$C_k = O_k + \left(-\eta\frac{\partial E}{\partial W_{ki}}(T_k - O_k)\right),$$

where $O_k$ represents the predicted electricity quantity, $T_k$ represents the two-way electricity quantity data of the energy storage station, $W_{ki}$ represents a weight of an $i^{th}$ node from a hidden layer to the output layer, $\eta$ represents a network learning rate, and $C_k$ represents the compensated two-way electricity quantity data;

a consensus node of a power-consuming enterprise and a consensus node of an energy storage station investment operator in the blockchain, configured to: perform consensus calculation on the two-way electricity quantity data, and after reaching a consensus, select one of the consensus node of the power-consuming enterprise and the consensus node of the energy storage station investment operator as a first accounting node, where the first accounting node is configured to process the two-way electricity quantity data to obtain a first target block, and write the first target block into the blockchain; and a smart contract execution node, configured to execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block; and the consensus node of the power-consuming enterprise and the consensus node of the energy storage station investment operator in the blockchain are further configured to: after reaching a consensus on the electricity charge settlement result, select one of the consensus node of the power-consuming enterprise and the consensus node of the energy storage station investment operator as a second accounting node, where the second accounting node is configured to process the electricity charge settlement result to obtain a second target block, and write the second target block into the blockchain.

The trusted terminal is specifically configured to:

encrypt the two-way electricity quantity data, and distribute encrypted two-way electricity quantity data to the blockchain.

Compared with the prior art, the present disclosure has the following beneficial effects.

In the present disclosure, the trusted terminal directly collects the two-way electricity quantity data of the energy storage station, and distributes the two-way electricity quantity data to the blockchain; and the consensus node of the power-consuming enterprise and the consensus node of the energy storage station investment operator in the blockchain perform consensus calculation on the two-way electricity quantity data, and write the two-way electricity quantity data into the blockchain after reaching the consensus. In this way, the two-way electricity quantity data is accurate and cannot be tampered with, thereby ensuring authenticity of the two-way electricity quantity data. In addition, the smart settlement contract is executed, the electricity charge settlement result is generated automatically based on the authentic and credible two-way electricity quantity data to ensure authenticity of the electricity charge settlement result, and the electricity charge settlement result is written into the blockchain to prevent the electricity charge settlement result from being tampered with.

BRIEF DESCRIPTION OF THE DRAWINGS

To describe the technical solutions in the embodiments of the present disclosure more clearly, the accompanying drawings required to describe the embodiments are briefly described below. Apparently, the accompanying drawings described below are only some embodiments of the present disclosure. Those of ordinary skill in the art may further obtain other accompanying drawings based on these accompanying drawings without inventive effort.

DETAILED DESCRIPTION

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

To make the above-mentioned objectives, features, and advantages of the present disclosure clearer and more comprehensible, the present disclosure will be further described in detail below with reference to the accompanying drawings and specific implementations.

Figure 1:
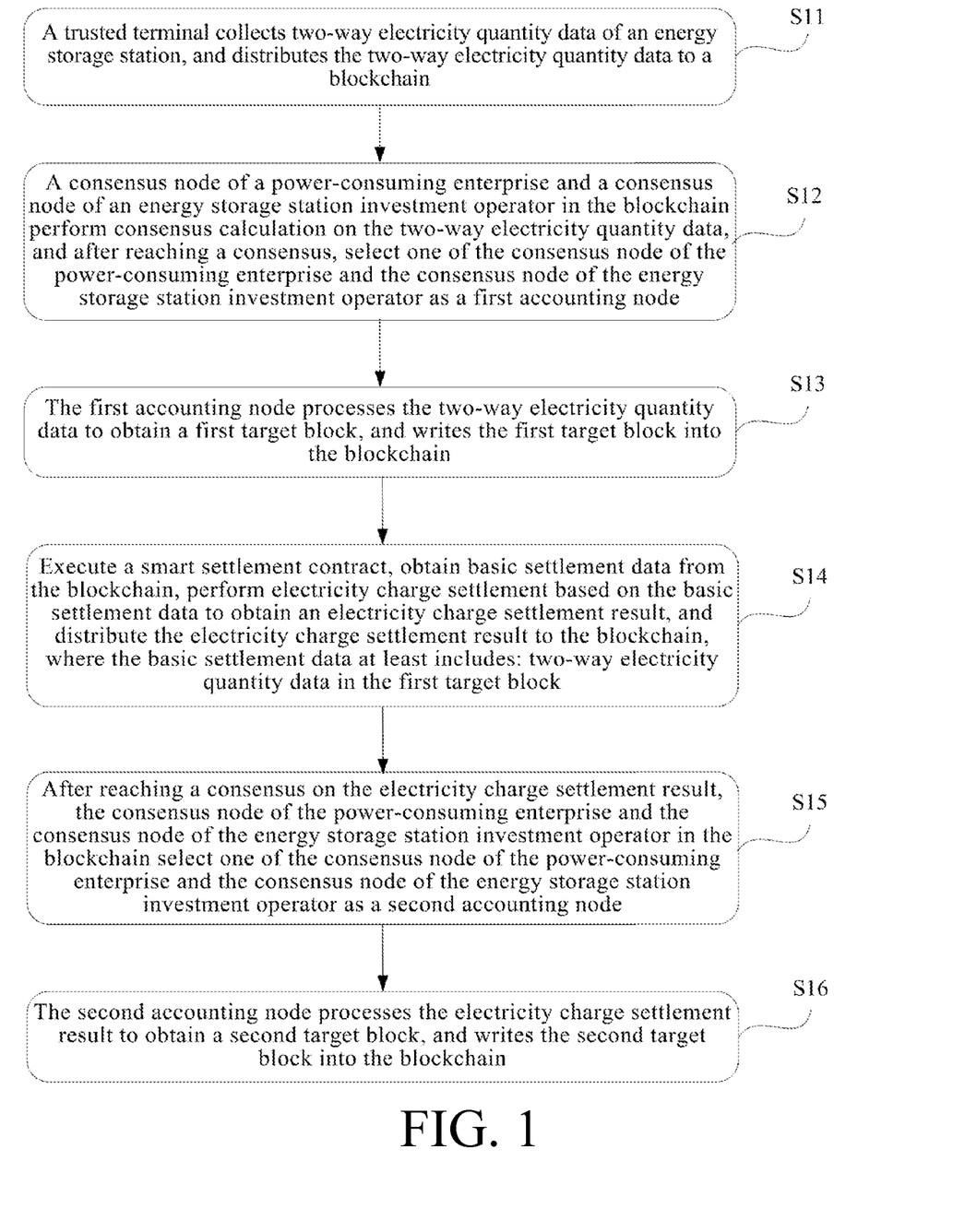
FIG. 1 is a flowchart of a blockchain-based electricity charge settlement method for an energy storage station according to Embodiment 1 of the present disclosure.

A blockchain-based electricity charge settlement method for an energy storage station according to an embodiment of the present disclosure is described below. FIG. 1 is a flowchart of a blockchain-based electricity charge settlement method for an energy storage station according to Embodiment 1 of the present disclosure. The method may include the following steps:

Step S11: A trusted terminal collects two-way electricity quantity data of an energy storage station, and distributes the two-way electricity quantity data to a blockchain.

In this embodiment, the energy storage station may be understood as a system that is built on a load side and is charged and discharged based on local peak and valley electricity price periods, and is generally an electrochemical energy storage station with a lead carbon battery or a lithium battery as a battery medium. The energy storage station is directly connected to a 400 V/10 kV/35 kV bus on the load side (such as a commercial complex or an industrial enterprise), and is charged in the case of a valley electricity price and discharged in the case of a peak electricity price to obtain an income from the differential electricity prices, or is charged and discharged based on a corresponding dispatching requirement of a power grid to obtain a certain economic income, so as to reduce an electricity charge of an enterprise while stabilizing the power grid.

The two-way electricity quantity data may be understood as forward electricity quantity data and reverse electricity quantity data. The forward electricity quantity data may be understood as data of an electricity quantity discharged by the energy storage station. The reverse electricity quantity data may be understood as data of an electricity quantity charged for the energy storage station. A saved electricity charge can be calculated as follows: "electricity price during discharging*electricity quantity discharged−electricity price during charging*electricity quantity charged".

It should be noted that the trusted terminal is a node in the blockchain. A process in which the trusted terminal becomes a node in the blockchain may be as follows: The trusted terminal applies for registration by uploading its own unique identifier in the Internet of Things, terminal hardware information, a network address, and other relevant information to the blockchain. After passing the verification and authentication performed by the blockchain, the trusted terminal packages all the information to generate block data and distributes the block data to the blockchain for broadcasting. After a consensus is reached, the trusted terminal becomes the node in the blockchain and has a public-private key pair. So far, the trusted terminal becomes the node with a unique identifier in the blockchain.

Step S12: A consensus node of a power-consuming enterprise and a consensus node of an energy storage station investment operator in the blockchain perform consensus calculation on the two-way electricity quantity data, and after reaching a consensus, select one of the consensus node of the power-consuming enterprise and the consensus node of the energy storage station investment operator as a first accounting node.

The consensus node of the power-consuming enterprise may be understood as a blockchain consensus node deployed locally by the power-consuming enterprise. The consensus node of the power-consuming enterprise may be deployed as follows: The power-consuming enterprise applies for registration by uploading its own business license, a bank's reference letter, and other documentary evidence to the blockchain. After passing the verification and authentication performed by the blockchain, the power-consuming enterprise packages all the information to generate block data and distributes the block data to the blockchain for broadcasting. After a consensus is reached, the consensus node of the power-consuming enterprise is deployed. The consensus node of the power-consuming enterprise becomes a node with a unique identifier in the blockchain. The consensus node of the power-consuming enterprise has a public-private key pair.

The consensus node of the energy storage station investment operator may be understood as a blockchain consensus node deployed locally by the energy storage station investment operator in a company of the energy storage station investment operator. The consensus node of the energy storage station investment operator may be deployed as follows: The energy storage station investment operator applies for registration by uploading its own business license, a bank's reference letter, and other documentary evidence to the blockchain. After passing the verification and authentication performed by the blockchain, the energy storage station investment operator packages all the information to generate block data and distributes the block data to the blockchain for broadcasting. After a consensus is reached, the consensus node of the energy storage station investment operator is deployed. The consensus node of the energy storage station investment operator becomes a node with a unique identifier in the blockchain. The consensus node of the energy storage station investment operator has a public-private key pair.

After the trusted terminal distributes the two-way electricity quantity data to the blockchain, the consensus node of the power-consuming enterprise and the consensus node of the energy storage station investment operator in the blockchain can perform consensus calculation on the two-way electricity quantity data by using, but not limited to, a byzantine fault tolerance (BFT) consensus algorithm.

Step S13: The first accounting node processes the two-way electricity quantity data to obtain a first target block, and writes the first target block into the blockchain.

The first accounting node can process the two-way electricity quantity data according to a specified block generation rule to obtain the first target block.

The writing the first target block into the blockchain may be understood as writing the first target block into a distributed ledger in the blockchain.

Step S14: Execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block.

In this embodiment, a trigger condition for executing the smart settlement contract may be set. When the trigger condition is met, all consensus nodes in the blockchain participate in the execution of the smart settlement contract.

That the trigger condition is met may include but is not limited to: an agreed settlement date, such as 0:00 on the 1st day of each month, arrives.

In this embodiment, the basic settlement data may include: a time-of-use electricity price, profit distribution proportions of the power-consuming enterprise and the energy storage station investment operator, and the two-way electricity quantity data in the first target block. A contract is generated after the power-consuming enterprise and the energy storage station investment operator perform offline negotiation on the time-of-use electricity price and the profit distribution proportions of the power-consuming enterprise and the energy storage station investment operator, and the contract is written into a smart contract in advance when the smart contract is developed.

In this embodiment, after the electricity charge settlement result is distributed to the blockchain, data generated during electricity charge settlement based on the two-way electricity quantity data can also be distributed to the blockchain.

Step S15: After reaching a consensus on the electricity charge settlement result, the consensus node of the power-consuming enterprise and the consensus node of the energy storage station investment operator in the blockchain select one of the consensus node of the power-consuming enterprise and the consensus node of the energy storage station investment operator as a second accounting node.

After the electricity charge settlement result is distributed to the blockchain, the consensus node of the power-consuming enterprise and the consensus node of the energy storage station investment operator in the blockchain can perform consensus calculation on the electricity charge settlement result by using, but not limited to, the BFT consensus algorithm, and after reaching the consensus, select one of the consensus node of the power-consuming enterprise and the consensus node of the energy storage station investment operator as the second accounting node.

Step S16: The second accounting node processes the electricity charge settlement result to obtain a second target block, and writes the second target block into the blockchain.

In this embodiment, the second accounting node can process the electricity charge settlement result according to the specified block generation rule to obtain the second target block.

In this embodiment, the data generated during electricity charge settlement based on the two-way electricity quantity data is automatically stored in the blockchain to realize traceability of the data generated in the process.

In this embodiment, a supervision department, a judicial department, an industry association, or a financial institution can also register with the blockchain and become a consensus node in the blockchain.

When the consensus node of the power-consuming enterprise, the consensus node of the energy storage station investment operator, or another node has a doubt about the electricity charge settlement result, data of the whole electricity charge settlement process in the blockchain can be verified and traced.

In the present disclosure, the trusted terminal directly collects the two-way electricity quantity data of the energy storage station, and distributes the two-way electricity quantity data to the blockchain; and the consensus node of the power-consuming enterprise and the consensus node of the energy storage station investment operator in the blockchain perform consensus calculation on the two-way electricity quantity data, and write the two-way electricity quantity data into the blockchain after reaching the consensus. In this way, the two-way electricity quantity data is accurate and cannot be tampered with, thereby ensuring authenticity of the two-way electricity quantity data. In addition, the smart settlement contract is executed, the electricity charge settlement result is generated automatically based on the authentic and credible two-way electricity quantity data to ensure authenticity of the electricity charge settlement result, and the electricity charge settlement result is written into the blockchain to prevent the electricity charge settlement result from being tampered with.

Figure 2:
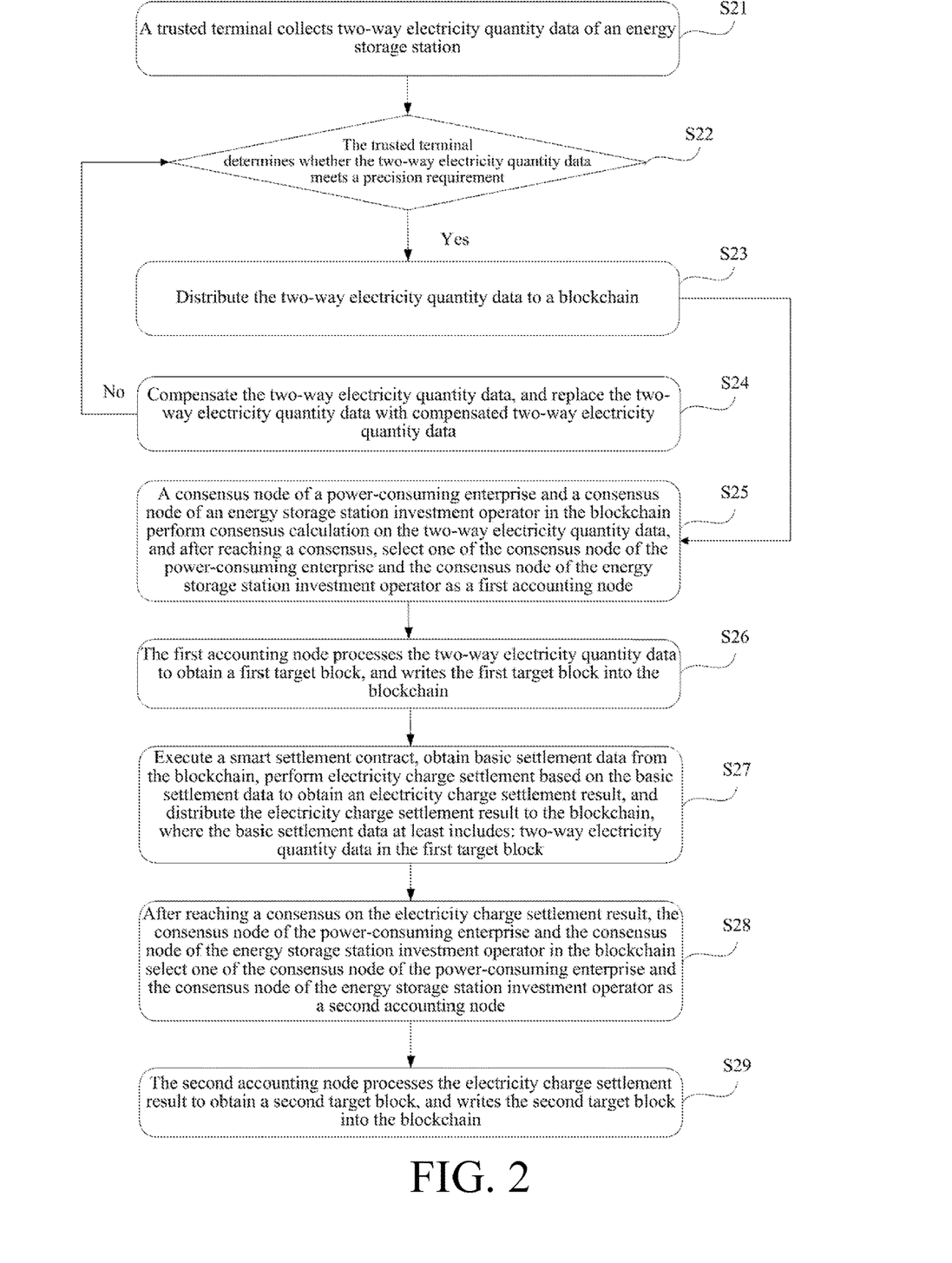
FIG. 2 is a flowchart of a blockchain-based electricity charge settlement method for an energy storage station according to Embodiment 2 of the present disclosure.

In another optional embodiment of the present disclosure, FIG. 2 is a flowchart of a blockchain-based electricity charge settlement method for an energy storage station according to Embodiment 2 of the present disclosure. This embodiment is mainly a detailed solution of the blockchain-based electricity charge settlement method for an energy storage station in Embodiment 1. As shown in FIG. 2, the method may include but is not limited to the following steps:

Step S21: A trusted terminal collects two-way electricity quantity data of an energy storage station.

For a detailed process in which the trusted terminal collects the two-way electricity quantity data of the energy storage station, refer to related description of step S11 in Embodiment 1. Details are not described herein again.

Step S22: The trusted terminal determines whether the two-way electricity quantity data meets a precision requirement.

If the two-way electricity quantity data meets the precision requirement, step S23 is performed; if the two-way electricity quantity data does not meet the precision requirement, step S24 is performed.

Step S23: Distribute the two-way electricity quantity data to a blockchain.

Step S24: Compensate the two-way electricity quantity data, replace the two-way electricity quantity data with compensated two-way electricity quantity data, and return to perform the step of determining whether the two-way electricity quantity data meets the precision requirement.

Steps S21 to S24 are a specific implementation of step S11 in Embodiment 1.

Step S25: A consensus node of a power-consuming enterprise and a consensus node of an energy storage station investment operator in the blockchain perform consensus calculation on the two-way electricity quantity data, and after reaching a consensus, select one of the consensus node of the power-consuming enterprise and the consensus node of the energy storage station investment operator as a first accounting node.

Step S26: The first accounting node processes the two-way electricity quantity data to obtain a first target block, and writes the first target block into the blockchain.

Step S27: Execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block.

Step S28: After reaching a consensus on the electricity charge settlement result, the consensus node of the power-consuming enterprise and the consensus node of the energy storage station investment operator in the blockchain select one of the consensus node of the power-consuming enterprise and the consensus node of the energy storage station investment operator as a second accounting node.

Step S29: The second accounting node processes the electricity charge settlement result to obtain a second target block, and writes the second target block into the blockchain.

For a detailed process of steps S25 to S29, refer to related description of steps S12 to S16 in Embodiment 1. Details are not described herein again.

In this embodiment, the trusted terminal determines whether the two-way electricity quantity data meets the precision requirement. When the two-way electricity quantity data meets the precision requirement, the trusted terminal distributes the two-way electricity quantity data to the blockchain. When the two-way electricity quantity data does not meet the precision requirement, the trusted terminal compensates the two-way electricity quantity data, replaces the two-way electricity quantity data with the compensated two-way electricity quantity data, and returns to perform the step of determining whether the two-way electricity quantity data meets the precision requirement, to ensure accuracy and precision of the collected two-way electricity quantity data. When the accuracy and precision of the collected two-way electricity quantity data are ensured, the two-way electricity quantity data is distributed to the blockchain to ensure that the data is accurate and cannot be tampered with.

Figure 3:
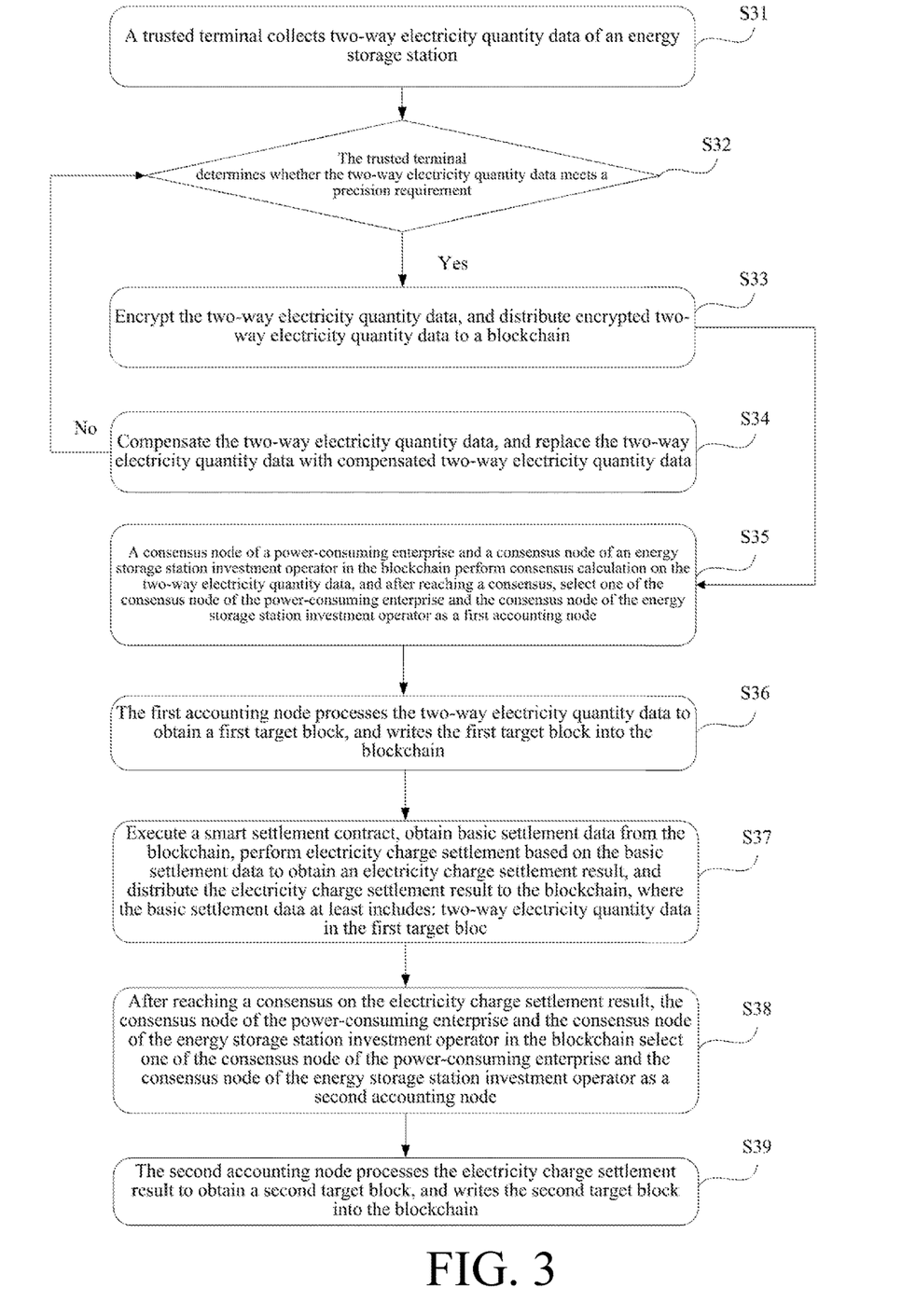
FIG. 3 is a flowchart of a blockchain-based electricity charge settlement method for an energy storage station according to Embodiment 3 of the present disclosure.

In another optional embodiment of the present disclosure, FIG. 3 is a flowchart of a blockchain-based electricity charge settlement method for an energy storage station according to Embodiment 3 of the present disclosure. This embodiment is mainly a detailed solution of the blockchain-based electricity charge settlement method for an energy storage station in Embodiment 2. As shown in FIG. 3, the method may include but is not limited to the following steps:

Step S31: A trusted terminal collects two-way electricity quantity data of an energy storage station.

For a detailed process in which the trusted terminal collects the two-way electricity quantity data of the energy storage station, refer to related description of step S21 in Embodiment 2. Details are not described herein again.

Step S32: The trusted terminal determines whether the two-way electricity quantity data meets a precision requirement.

If the two-way electricity quantity data meets the precision requirement, step S33 is performed; if the two-way electricity quantity data does not meet the precision requirement, step S34 is performed.

For a detailed process of steps S31 and S32, refer to related description of steps S21 and S22 in Embodiment 2. Details are not described herein again.

Step S33: Encrypt the two-way electricity quantity data, and distribute encrypted two-way electricity quantity data to a blockchain.

The encrypting the two-way electricity quantity data may be understood as: performing hash calculation and asymmetric encryption on the two-way electricity quantity data.

Step S34: Compensate the two-way electricity quantity data, replace the two-way electricity quantity data with compensated two-way electricity quantity data, and return to perform the step of determining whether the two-way electricity quantity data meets the precision requirement.

Step S35: A consensus node of a power-consuming enterprise and a consensus node of an energy storage station investment operator in the blockchain perform consensus calculation on the two-way electricity quantity data, and after reaching a consensus, select one of the consensus node of the power-consuming enterprise and the consensus node of the energy storage station investment operator as a first accounting node.

Step S36: The first accounting node processes the two-way electricity quantity data to obtain a first target block, and writes the first target block into the blockchain.

Step S37: Execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block.

Step S38: After reaching a consensus on the electricity charge settlement result, the consensus node of the power-consuming enterprise and the consensus node of the energy storage station investment operator in the blockchain select one of the consensus node of the power-consuming enterprise and the consensus node of the energy storage station investment operator as a second accounting node.

Step S39: The second accounting node processes the electricity charge settlement result to obtain a second target block, and writes the second target block into the blockchain.

For a detailed process of steps S35 to S39, refer to related description of steps S25 to S29 in Embodiment 2. Details are not described herein again.

In this embodiment, the two-way electricity quantity data is encrypted, and the encrypted two-way electricity quantity data is distributed to the blockchain. This ensures transmission security of the two-way electricity quantity data, and further ensures accuracy and authenticity of data used for electricity charge settlement.

Figure 4:
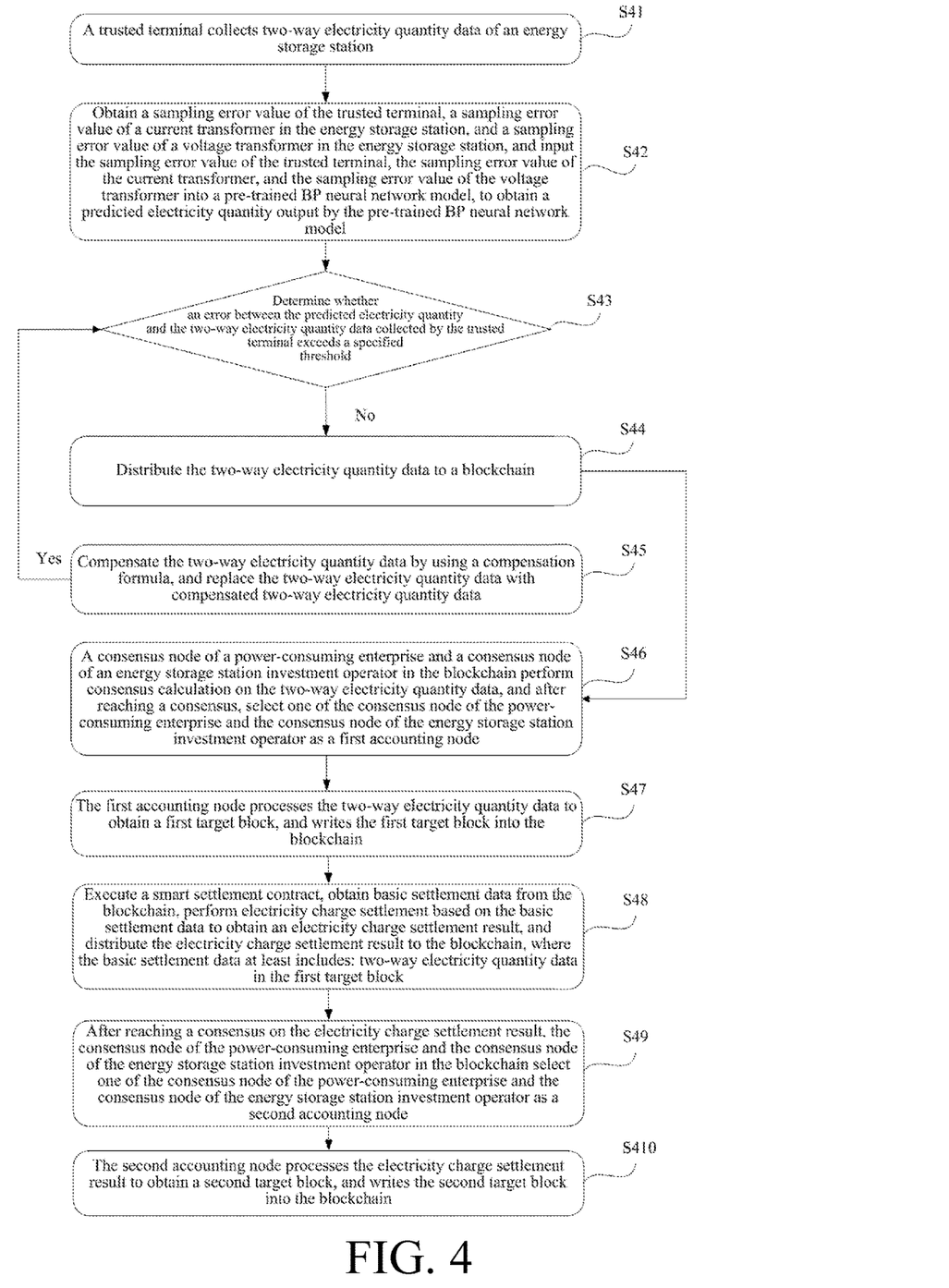
FIG. 4 is a flowchart of a blockchain-based electricity charge settlement method for an energy storage station according to Embodiment 4 of the present disclosure.

In another optional embodiment of the present disclosure, FIG. 4 is a flowchart of a blockchain-based electricity charge settlement method for an energy storage station according to Embodiment 4 of the present disclosure. This embodiment is mainly a detailed solution of the blockchain-based electricity charge settlement method for an energy storage station described in Embodiment 2. As shown in FIG. 4, the method may include but is not limited to the following steps:

Step S41: A trusted terminal collects two-way electricity quantity data of an energy storage station.

For a detailed process in which the trusted terminal collects the two-way electricity quantity data of the energy storage station, refer to related description of step S21 in Embodiment 2. Details are not described herein again.

Step S42: Obtain a sampling error value of the trusted terminal, a sampling error value of a current transformer in the energy storage station, and a sampling error value of a voltage transformer in the energy storage station, and input the sampling error value of the trusted terminal, the sampling error value of the current transformer, and the sampling error value of the voltage transformer into a pre-trained BP neural network model, to obtain a predicted electricity quantity output by the pre-trained BP neural network model.

In this embodiment, a process of training a BP neural network model may include the following steps:

S421: Initialize parameters of each layer in the BP neural network model.

Figure 5:
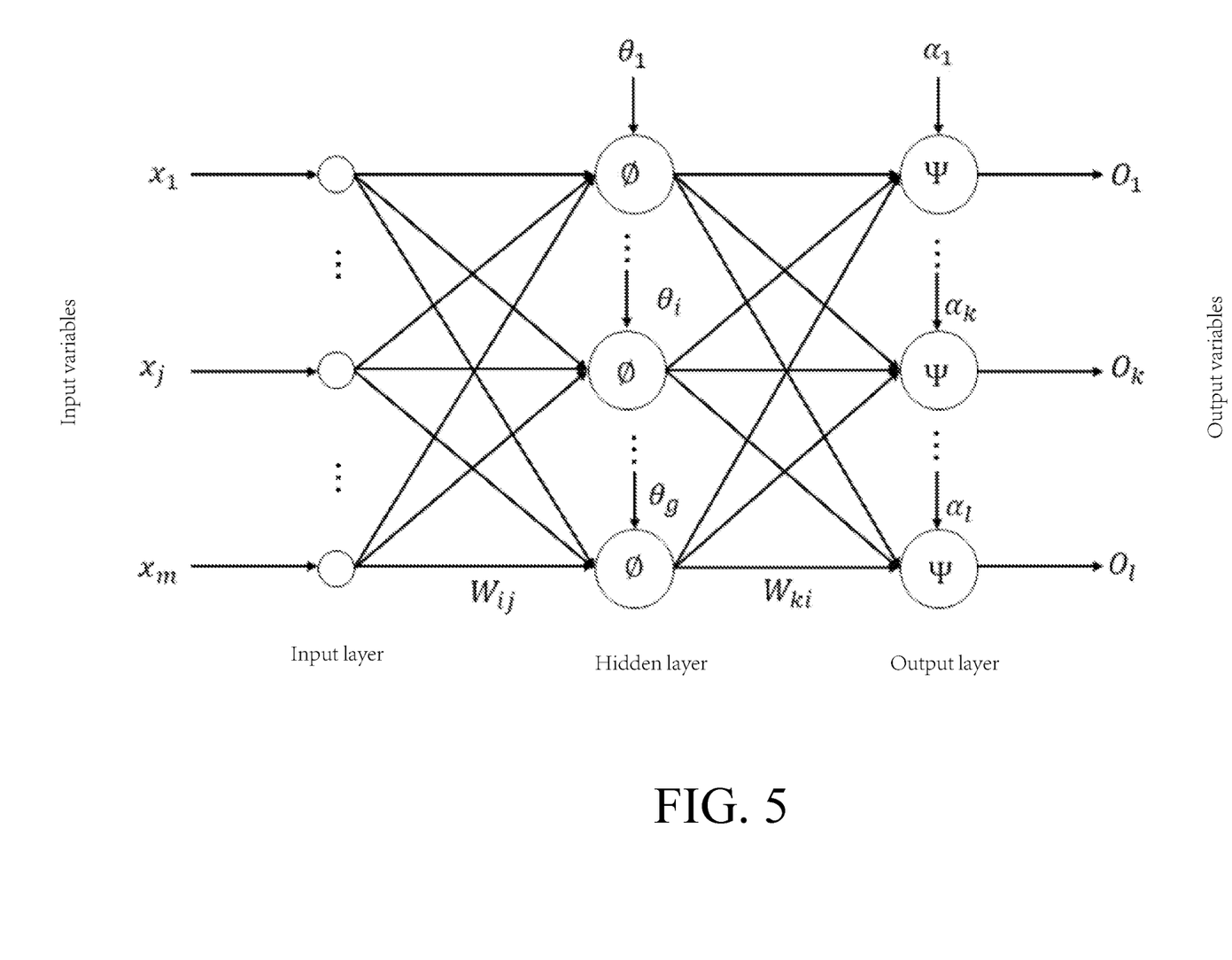
FIG. 5 is a schematic structural diagram of a BP neural network model according to the present disclosure.

In this embodiment, as shown in FIG. 5, the BP neural network model may include an input layer, a hidden layer, and an output layer. Input variables of the input layer are the sampling error value of the trusted terminal, the sampling error value of the current transformer in the energy storage station, and the sampling error value of the voltage transformer in the energy storage station. $W_{ij}$ represents a weight of a connection between a $j^{th}$ node at the input layer and an $i^{th}$ node at the hidden layer, $W_{ki}$ represents a weight of the $i^{th}$ node from the hidden layer to the output layer, $\theta_i$ represents an output threshold of the $i^{th}$ node at the hidden layer, $\alpha_k$ represents an output threshold of a $k^{th}$ node at the output layer, an activation function of the hidden layer is $\phi$, and an activation function of the output layer is $\psi$.

A presentation function of a forward propagation process of a neural network may be $$y_1 = f(net_i) = f\left(\sum_{j=1}^{M} W_{ij} x_j + \theta_j\right).$$

An output result of the output layer may be expressed as $$O_k = \psi(net_i) = \psi\left(\sum_{k=1}^{L} W_{ki} y_i + \alpha_k\right) = \psi\left(\sum_{k=1}^{L} W_{ki} \phi\left(\sum_{j=1}^{M} W_{ij} x_i + \theta_j\right) + \alpha_k\right).$$

In this embodiment, a quantity of nodes at the hidden layer may be confirmed according to an empirical formula $N_y = N + 0.618(N-L)$.

In the above formula, N represents a quantity of nodes at the input layer in the BP neural network model, and L represents a quantity of nodes at the output layer in the BP neural network model.

S422: Select a training sample from a sample set, and input the training sample into the BP neural network model to obtain a predicted electricity quantity output by the BP neural network model, where the training sample is the sampling error value of the trusted terminal, the sampling error value of the current transformer in the energy storage station, and the sampling error value of the voltage transformer in the energy storage station.

S423: Input the predicted electricity quantity and the two-way electricity quantity data of the energy storage station into a neural network error function $$E = \frac{1}{2} \sum_{q=1}^{p} \sum_{K=1}^{L} (T_k - O_k)^2,$$

to obtain an error.

In the above function, $O_k$ represents the predicted electricity quantity, $T_k$ represents the two-way electricity quantity data of the energy storage station, p represents a quantity of training samples, q represents the training sample, L represents the quantity of nodes at the output layer in the BP neural network model, K represents a node at the output layer in the BP neural network model, and E represents the error.

S424: Determine whether an error between the predicted electricity quantity and a reference electricity quantity is within a specified range.

If the error between the predicted electricity quantity and the reference electricity quantity is within the specified range, step S425 is performed; if the error between the predicted electricity quantity and the reference electricity quantity is not within the specified range, step S426 is performed.

The reference electricity quantity and the specified range may be set based on actual needs, and are not limited in the present disclosure.

S425: End the training.

S426: Transmit the error to each layer in the BP neural network model based on an order from the output layer to the input layer in the BP neural network model, to update the parameters of each layer in the BP neural network model, and return to the step of selecting the training sample from the sample set.

The transmitting the error to each layer in the BP neural network model based on an order from the output layer to the input layer in the BP neural network model, to update the parameters of each layer in the BP neural network model may be understood as: updating the parameters of each layer in the BP neural network model by using a back propagation principle.

In this embodiment, a process of updating the parameters of each layer in the BP neural network model may include but is not limited to the following steps:

updating a weight and a threshold of the output layer based on a correction amount $$\Delta W_{ki} = -\eta \frac{\partial E}{\partial W_{ki}}$$

of the weight of the output layer, a correction amount of the threshold of the output layer $$\Delta \alpha_k = -\eta \frac{\partial E}{\partial \alpha_k},$$

and an error gradient descent algorithm; and
updating a weight and a threshold of the hidden layer based on a correction amount $$\Delta W_{ij} = -\eta \frac{\partial E}{\partial W_{ij}}$$

of the weight of the hidden layer, a correction amount of the threshold of the hidden layer $$\Delta \theta_i = \eta \frac{\partial E}{\partial \theta_i},$$

and the error gradient descent algorithm; where
$\eta$ represents a network learning rate.

Step S43: Determine whether an error between the predicted electricity quantity and the two-way electricity quantity data collected by the trusted terminal exceeds a specified threshold.

If the error between the predicted electricity quantity and the two-way electricity quantity data does not exceed the specified threshold, step S44 is performed; if the error between the predicted electricity quantity and the two-way electricity quantity data exceeds the specified threshold, step S45 is performed.

In this embodiment, the specified threshold may be set based on needs, and is not limited in the present disclosure.

Steps S42 and S43 are a specific implementation of step S22 in Embodiment 2.

Step S44: Distribute the two-way electricity quantity data to a blockchain.

Step S45: Compensate the two-way electricity quantity data by using a compensation formula $$C_k = O_k + \left(-\eta \frac{\partial E}{\partial W_{ki}}(T_k - O_k)\right),$$

replace the two-way electricity quantity data with compensated two-way electricity quantity data, and return to perform the step of determining whether the two-way electricity quantity data meets the precision requirement.

In the above formula, $O_k$ represents the predicted electricity quantity, $T_k$ represents the two-way electricity quantity data of the energy storage station, $W_{ki}$ represents the weight between the $i^{th}$ node at the hidden layer and the output layer, $\eta$ represents the network learning rate, and $C_k$ represents the compensated two-way electricity quantity data.

It should be noted that $O_k$ and $T_k$ in $$C_k = O_k + \left(-\eta \frac{\partial E}{\partial W_{ki}}(T_k - O_k)\right)$$

are the same as $O_k$ and $T_k$ in $$E = \frac{1}{2}\sum_{q=1}^{p}\sum_{K=1}^{L}(T_k - O_k)^2,$$

but in $$E = \frac{1}{2}\sum_{q=1}^{p}\sum_{K=1}^{L}(T_k - O_k)^2,$$

$O_k$ represents the predicted electricity quantity output by the BP neural network model in the training process, and $T_k$ represents the collected two-way electricity quantity data of the energy storage station when the BP neural network model is trained; and in $$C_k = O_k + \left(-\eta \frac{\partial E}{\partial W_{ki}}(T_k - O_k)\right),$$

$O_k$ represents the predicted electricity quantity output by the pre-trained BP neural network model, and $T_k$ represents the collected two-way electricity quantity data of the energy storage station when the pre-trained BP neural network model is applied.

Step S46: A consensus node of a power-consuming enterprise and a consensus node of an energy storage station investment operator in the blockchain perform consensus calculation on the two-way electricity quantity data, and after reaching a consensus, select one of the consensus node of the power-consuming enterprise and the consensus node of the energy storage station investment operator as a first accounting node.

Step S47: The first accounting node processes the two-way electricity quantity data to obtain a first target block, and writes the first target block into the blockchain.

Step S48: Execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block.

Step S49: After reaching a consensus on the electricity charge settlement result, the consensus node of the power-consuming enterprise and the consensus node of the energy storage station investment operator in the blockchain select one of the consensus node of the power-consuming enterprise and the consensus node of the energy storage station investment operator as a second accounting node.

Step S410: The second accounting node processes the electricity charge settlement result to obtain a second target block, and writes the second target block into the blockchain.

In this embodiment, the BP neural network model determines the precision requirement of the two-way electricity quantity data. This can improve accuracy of determining the precision requirement, and improve accuracy and precision of the collected two-way electricity quantity data. When the accuracy and precision of the collected two-way electricity quantity data are ensured, the two-way electricity quantity data is distributed to the blockchain to further the accuracy of the data.

Next, a blockchain-based electricity charge settlement system for an energy storage station in the present disclosure is described. The system and the above-described blockchain-based electricity charge settlement method for an energy storage station can be cross-referenced.

Figure 6:
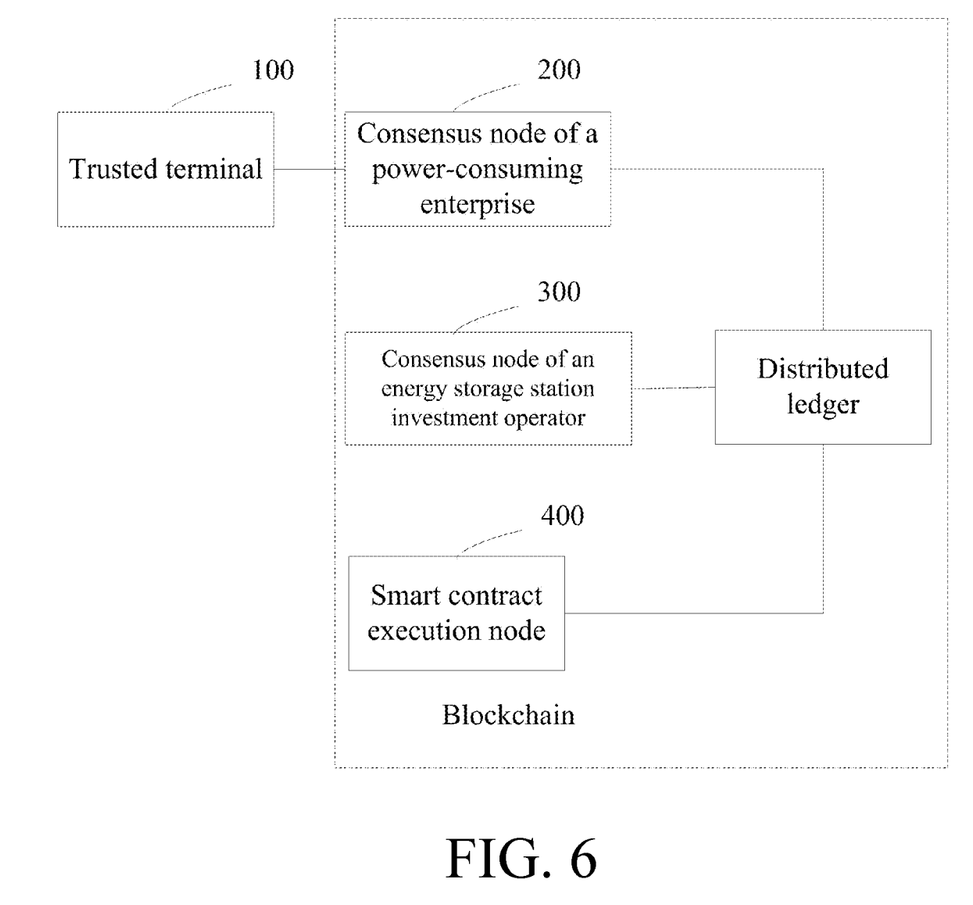
FIG. 6 is schematic diagram of a logical structure of a blockchain-based electricity charge settlement system for an energy storage station according to the present disclosure.

As shown in FIG. 6, the blockchain-based electricity charge settlement system for an energy storage station includes a trusted terminal 100, a consensus node 200 of a power-consuming enterprise and a consensus node 300 of an energy storage station investment operator as a second in a blockchain, and a smart contract execution node 400.

The trusted terminal 100 is configured to collect two-way electricity quantity data of an energy storage station, and distribute the two-way electricity quantity data to the blockchain.

The consensus node 200 of the power-consuming enterprise and the consensus node 300 of the energy storage station investment operator in the blockchain are configured to perform consensus calculation on the two-way electricity quantity data, and after reaching a consensus, select one of the consensus node 200 of the power-consuming enterprise and the consensus node 300 of the energy storage station investment operator as a first accounting node, where the first accounting node is configured to process the two-way electricity quantity data to obtain a first target block, and write the first target block into the blockchain.

The writing the first target block into the blockchain may be understood as writing the first target block into a distributed ledger in the blockchain.

The smart contract execution node 400 is configured to execute a smart settlement contract, obtain basic settlement data from the blockchain, perform electricity charge settlement based on the basic settlement data to obtain an electricity charge settlement result, and distribute the electricity charge settlement result to the blockchain, where the basic settlement data at least includes: two-way electricity quantity data in the first target block.

The consensus node 200 of the power-consuming enterprise and the consensus node 300 of the energy storage station investment operator in the blockchain are further configured to: after reaching a consensus on the electricity charge settlement result, select one of the consensus node 200 of the power-consuming enterprise and the consensus node 300 of the energy storage station investment operator as a second accounting node, where the second accounting node is configured to process the electricity charge settlement result to obtain a second target block, and write the second target block into the blockchain.

The writing the second target block into the blockchain may be understood as writing the second target block into the distributed ledger in the blockchain.

In this embodiment, the trusted terminal 100 may be specifically configured to:
collect the two-way electricity quantity data of the energy storage station and determine whether the two-way electricity quantity data meets a precision requirement; and
if the two-way electricity quantity data meets the precision requirement, distribute the two-way electricity quantity data to the blockchain; or
if the two-way electricity quantity data does not meet the precision requirement, compensate the two-way electricity quantity data, replace the two-way electricity quantity data with compensated two-way electricity quantity data, and return to perform the step of determining whether the two-way electricity quantity data meets the precision requirement.

In this embodiment, the trusted terminal 100 may be specifically configured to:
encrypt the two-way electricity quantity data, and distribute encrypted two-way electricity quantity data to the blockchain.

In this embodiment, the trusted terminal 100 may be specifically configured to:
obtain a sampling error value of the trusted terminal 100, a sampling error value of a current transformer in the energy storage station, and a sampling error value of a voltage transformer in the energy storage station, and input the sampling error value of the trusted terminal 100, the sampling error value of the current transformer, and the sampling error value of the voltage transformer into a pre-trained BP neural network model, to obtain a predicted electricity quantity output by the pre-trained BP neural network model; and
determine whether an error between the predicted electricity quantity and the two-way electricity quantity data collected by the trusted terminal 100 exceeds a specified threshold.

A process of training a BP neural network model includes:
initializing parameters of each layer in the BP neural network model;
selecting a training sample from a sample set, and inputting the training sample into the BP neural network model to obtain a predicted electricity quantity output by the BP neural network model, where the training sample is the sampling error value of the trusted terminal 100, the sampling error value of the current transformer in the energy storage station, and the sampling error value of the voltage transformer in the energy storage station;

inputting the predicted electricity quantity and the two-way electricity quantity data of the energy storage station to a neural network error function $$E = \frac{1}{2}\sum_{q=1}^{p}\sum_{K=1}^{L}(T_k - O_k)^2,$$

where $O_k$ represents the predicted electricity quantity, $T_k$ represents the two-way electricity quantity of the energy storage station, p represents a quantity of training samples, q represents the training sample, L represents a quantity of nodes at an output layer in the BP neural network model, K represents a node at the output layer in the BP neural network model, and E represents the error;

determining whether an error between the predicted electricity quantity and a reference electricity quantity is within a specified range; and if the error between the predicted electricity quantity and the reference electricity quantity is within the specified range, ending the process; or if the error between the predicted electricity quantity and the reference electricity quantity is not within the specified range, transmitting the error to each layer in the BP neural network model based on an order from the output layer to an input layer in the BP neural network model, to update the parameters of each layer in the BP neural network model, and returning to the step of selecting the training sample from the sample set.

The trusted terminal 100 may be specifically configured to:

compensate the two-way electricity quantity data by using a compensation formula $$C_k = O_k + \left(-\eta \frac{\partial E}{\partial W_{ki}}(T_k - O_k)\right).$$

In this embodiment, the smart contract execution node 400 may be further configured to:

distribute data generated during electricity charge settlement based on the two-way electricity quantity data to the blockchain.

The second accounting node may further be configured to process the data generated during electricity charge settlement based on the two-way electricity quantity data to obtain a third target block, and write the third target block into the blockchain.

The writing the third target block into the blockchain may be understood as writing the third target block into the distributed ledger in the blockchain.

In this embodiment of the present disclosure, the consensus node 200 of the power-consuming enterprise and the consensus node 300 of the energy storage station investment operator in the blockchain, and the smart contract execution node 400 each may be one or more processors or chips that each have a communication interface, can realize a communication protocol, and may further include a memory, a related interface and system transmission bus, and the like if necessary. The processor or chip executes program-related code to realize a corresponding function.

It should be noted that all embodiments focus on the differences from other embodiments. The same or similar portions of these embodiments may refer to one another. For an apparatus embodiment, since it is basically similar to the method embodiment, the description is relatively simple, and reference can be made to the description of the method embodiment.

Finally, it should be further noted that, in this specification, relationship terms such as first and second are only used to distinguish an entity or operation from another entity or operation, but do not necessarily require or imply that there is any actual relationship or order between these entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. In the case that there are no more restrictions, an element limited by the statement "includes a . . . " does not exclude the presence of additional identical elements in the process, the method, the article, or the device that includes the element.

For ease of description, the foregoing apparatus is divided into various units based on functions for separate description. Certainly, functions of different units may be implemented in one or more pieces of software and/or hardware during implementation of the present disclosure.

Through the description of the foregoing implementations, those skilled in the art can clearly understand that the present disclosure can be implemented by means of software plus a necessary universal hardware platform. Based on such understanding, the technical solutions of the present disclosure essentially, or the part contributing to the prior art may be embodied as a software product. The computer software product may be stored in a storage medium, such as a ROM/RAM, a magnetic disk or an optical disk, and includes a plurality of instructions for instructing a computer device (which may be a personal computer, a server, or a network device) to implement the method in the embodiments or parts of the embodiments.

The blockchain-based electricity charge settlement method and system for an energy storage station are described in detail above. Specific examples are used for illustration of the principles and implementations of the present disclosure. The description of the above embodiments is only intended to help understand the method and core idea of the present disclosure. Meanwhile, a person of ordinary skill in the art may, based on the idea of the present disclosure, make modifications with respect to the specific implementations and the application scope. Therefore, the content of this specification shall not be construed as a limitation to the present disclosure.

The invention claimed is:

1. A blockchain-based electricity charge settlement method for an energy storage station, comprising:

collecting, by a trusted terminal, two-way electricity quantity data of an energy storage station, and distributing the two-way electricity quantity data to a blockchain, wherein the collecting, by a trusted terminal, two-way electricity quantity data of an energy storage station, and distributing the two-way electricity quantity data to a blockchain comprises: collecting, by the trusted terminal, the two-way electricity quantity data of the energy storage station, and determining whether the two-way electricity quantity data meets a precision requirement; and if the two-way electricity quantity data meets the precision requirement, distributing the two-way electricity quantity data to the blockchain; or if the two-way electricity quantity data does not meet the precision requirement, compensating the two-way electricity quantity data, replacing the two-way electricity quantity data with compensated two-way electricity quantity data, and returning to perform the step of determining whether the two-way electricity quantity data meets the precision requirement, wherein the determining whether the two-way electricity quantity data meets a precision requirement comprises: obtaining a sampling error value of the trusted terminal, a sampling error value of a current transformer in the energy storage station, and a sampling error value of a voltage transformer in the energy storage station, inputting the sampling error value of the trusted terminal, the sampling error value of the current transformer, and the sampling error value of the voltage transformer into a pre-trained back propagation (BP) neural network model, to obtain a predicted electricity quantity output by the pre-trained BP neural network model, and determining whether an error between the predicted electricity quantity and the two-way electricity quantity data collected by the trusted terminal exceeds a specified threshold; a process of training a BP neural network model comprises: initializing parameters of each layer in the BP neural network model; selecting a training sample from a sample set; inputting the training sample into the BP neural network model to obtain a predicted electricity quantity output by the BP neural network model, wherein the training sample comprises the sampling error value of the trusted terminal, the sampling error value of the current transformer in the energy storage station, and the sampling error value of the voltage transformer in the energy storage station; inputting the predicted electricity quantity and the two-way electricity quantity data of the energy storage station into a neural network error function $$E = \frac{1}{2}\sum_{q=1}^{P}\sum_{K=1}^{L}(T_k - O_k)^2$$

to obtain an error, wherein $O_k$ represents the predicted electricity quantity, $T_k$ represents the two-way electricity quantity data of the energy storage station, P represents a quantity of training samples, L represents a quantity of nodes at an output layer in the BP neural network model, K represents a node at the output layer in the BP neural network model, and E represents the error; determining whether an error between the predicted electricity quantity and a reference electricity quantity is within a specified range; and if the error between the predicted electricity quantity and the reference electricity quantity is within the specified range, ending the training; or if the error between the predicted electricity quantity and the reference electricity quantity is not within the specified range, transmitting the error to each layer in the BP neural network model based on an order from the output layer to an input layer in the BP neural network model, to update the parameters of each layer in the BP neural network model, and returning to perform the step of selecting the training sample from the sample set; and the compensating the two-way electricity quantity data comprises: compensating the two-way electricity quantity data by using a compensation formula $$C_k = O_k + \left(-\eta \frac{\partial E}{\partial W_{ki}}(T_k - O_k)\right),$$

wherein $O_k$ represents the predicted electricity quantity, $T_k$ represents the two-way electricity quantity data of the energy storage station, $W_{ki}$ represents a weight of an ith node from a hidden layer to the output layer, $\eta$ represents a network learning rate, and $C_k$ represents the compensated two-way electricity quantity data;

performing, by a consensus node of a power-consuming enterprise and a consensus node of an energy storage station investment operator in the blockchain, consensus calculation on the two-way electricity quantity data, and after reaching a consensus, selecting one of the consensus node of the power-consuming enterprise and the consensus node of the energy storage station investment operator as a first accounting node;

processing, by the first accounting node, the two-way electricity quantity data to obtain a first target block, and writing the first target block into the blockchain;

executing, by a smart contract execution node, a smart settlement contract, obtaining basic settlement data from the blockchain, performing electricity charge settlement based on the basic settlement data to obtain an electricity charge settlement result, and distributing the electricity charge settlement result to the blockchain, wherein the basic settlement data at least comprises: two-way electricity quantity data in the first target block;

selecting, by the consensus node of the power-consuming enterprise and the consensus node of the energy storage station investment operator in the blockchain after reaching a consensus on the electricity charge settlement result, one of the consensus node of the power-consuming enterprise and the consensus node of the energy storage station investment operator as a second accounting node; and processing, by the second accounting node, the electricity charge settlement result to obtain a second target block, and writing the second target block into the blockchain;

the consensus node of the power-consuming enterprise, the consensus node of the energy storage station investment operator and the smart contract execution node in the blockchain each are one or more processors or chips that each have a communication interface and realize a communication protocol.

2. The method according to claim 1, wherein the distributing the two-way electricity quantity data to a blockchain comprises:

encrypting the two-way electricity quantity data, and distributing encrypted two-way electricity quantity data to the blockchain.

\* \* \* \* \*